United States Patent

Nakae et al.

[11] Patent Number: 5,826,671
[45] Date of Patent: Oct. 27, 1998

[54] APPARATUS FOR CONTROLLING HYBRID VEHICLE AND METHOD OF THE SAME

[75] Inventors: Koichi Nakae; Kiyoo Hirose, both of Susono, Japan

[73] Assignee: Toyota Jidosha Kabushiki Kaisha, Toyota, Japan

[21] Appl. No.: 766,473

[22] Filed: Dec. 12, 1996

[30] Foreign Application Priority Data

Dec. 27, 1995 [JP] Japan .................................. 7-352569

[51] Int. Cl.⁶ ........................................................ B60K 6/00
[52] U.S. Cl. ...................... 180/85.2; 180/65.3; 123/179.4
[58] Field of Search ................................ 180/65.2, 65.3; 123/179.4, 198 DB, 198 DC

[56] References Cited

U.S. PATENT DOCUMENTS

| | | | |
|---|---|---|---|
| 4,454,843 | 6/1984 | Uchida et al. | 123/179.4 |
| 5,629,853 | 5/1997 | Ogawa et al. | 364/431.51 |
| 5,632,238 | 5/1997 | Furukawa et al. | 123/179.3 |
| 5,670,830 | 9/1997 | Koga et al. | 307/10.1 |
| 5,732,681 | 3/1998 | Ogita | 123/492 |

FOREIGN PATENT DOCUMENTS

| | | | |
|---|---|---|---|
| 58-162747 | 9/1983 | Japan | 123/179.4 |
| 59-82542 | 5/1984 | Japan | 123/179.4 |
| 6-48190 | 2/1994 | Japan . | |

*Primary Examiner*—Brian L. Johnson
*Assistant Examiner*—Bridget Avery

*Attorney, Agent, or Firm*—Oblon, Spivak, McClelland, Maier & Neustadt, P.C.

[57] ABSTRACT

In an internal combustion engine of a hybrid vehicle, a transient driving state occurs at a high frequency. It is rather difficult to control the quantity of fuel due to an adhesion of the fuel on the wall surface in the transient driving state. This results in insufficient reduction of the emission in the transient driving state. The object is thus to provide a vehicle control apparatus that can realize the effective reduction of emission. The vehicle control apparatus receives vehicle information (S200) and determines, based on the input vehicle information, whether or not the state of the vehicle should be shifted from either a combination mode or an internal combustion engine mode to a motor mode, that is, whether or not operation of an internal combustion engine EG is going to stop (S202). When such a mode shift is required, it is determined whether or not a specific warm-up condition is satisfied (S204). The specific warm-up condition is used as a criterion for determining whether or not a fuel-air intake system of the internal combustion engine EG shows a sufficient increase in temperature based on the data of a cooling water temperature sensor and reaches a stationary state, wherein the amount of fuel injected and supplied into the fuel-air intake system and adhering to the wall surface can be estimated readily. When it is determined that the specific warm-up condition is satisfied, the program exits from the routine. When it is determined that the specific warm-up condition is not fulfilled, on the other hand, a table correction process is carried out (S206) to modify the contents of a mode selection table and change the motor mode to the combination mode.

14 Claims, 7 Drawing Sheets

APPARATUS FOR CONTROLLING HYBRID VEHICLE AND METHOD OF THE SAME

BACKGROUND OF THE INVENTION

1. Field of the Invention

The present invention relates to an apparatus for controlling a vehicle with an internal combustion engine and another prime mover mounted thereon, that is, a hybrid vehicle, or more specifically controlling the internal combustion engine included in such a hybrid vehicle. The present invention also pertains to a method of controlling such a hybrid vehicle or more specifically an internal combustion engine included in the hybrid vehicle.

2. Description of the Prior Art

Hybrid vehicles with an internal combustion engine and a motor have been proposed recently. The hybrid vehicles include a first type controlled to enable wheels to be driven by both the internal combustion engine and the motor and a second type controlled to enable the internal combustion engine to generate electric power while the wheels are driven only by the motor. In any type of hybrid vehicles, the internal combustion engine is switched from a drive position to a stop position or vice versa during a drive of the vehicle.

Some proposed apparatuses for executing the above control adopt a control procedure for obtaining an appropriate high output corresponding to a requirement of acceleration from a driver (for example, JAPANESE PATENT LAYING-OPEN GAZETTE No. 6-48190). Such apparatus determines a requirement of acceleration from the driver based on the accelerator pedal position as well as a variation in accelerator pedal position and a variation in step-on force of the accelerator pedal, and appropriately changes the driving mode of the internal combustion engine and the motor based on the results of determination. There are three available driving modes, that is, an internal combustion engine mode for driving the vehicle only by the internal combustion engine, a motor mode for driving the vehicle only by the motor, and a combination mode for driving the vehicle by both the internal combustion engine and the motor. When the requirement of acceleration by the driver is intense, the driving mode is immediately switched from the motor mode to the combination mode and kept at the combination mode until the vehicle runs at a higher speed.

The apparatus for controlling hybrid vehicle is required to balance a pollution-free drive by the motor and a drive by the internal combustion engine which compensates for the demerits of the motor to realize easy supplement of energy, high output, and continuation. A great effort is made to calculate the balanced point based on the data of various sensors while taking into account the psychological influence on the driver.

The prior art apparatuses as discussed above, however, still have problems below.

Compared with a conventional vehicle driven only by the internal combustion engine, frequent starts and stops of the internal combustion engine are inevitable while the hybrid vehicle is driven. This means that the internal combustion engine controlled by the apparatus frequently falls into a transient state. The control procedure is complicated in the transient state. Especially when the internal combustion engine is driven in the cold, the low temperatures of the wall surface of the air intake system and the combustion chamber increase the amount of fuel adhering to the wall surface. Uneven distributions of the temperature in the air intake system and the respective parts of the internal combustion engine cause the amount of fuel adhering to the wall surface to be varied unstably. While the internal combustion engine is at a stop, the fuel adhering to the wall surface is gradually vaporized. When the internal combustion engine is started again before the fuel adhering to the wall surface is sufficiently vaporized, the remaining fuel causes an error. This prevents a target quantity of fuel from being accurately supplied at the time of a re-start of the internal combustion engine. At the time of starting the internal combustion engine, appropriate fuel supply control is significantly difficult since a greater amount of fuel is to be injected and no feedback control of the air/fuel ratio is carried out. When the start and stop of the internal combustion engine is repeated frequently, the deviation from the target level of control due to the vaporized fuel is accumulated and remarkably increases.

In the conventional apparatus, the vehicle loading is partly applied to the motor in the motor mode and the combination mode. This ensures comprehensive reduction of the emission from the internal combustion engine. When the driving state of the internal combustion engine is observed in a microscopic level, however, the internal combustion engine falls into the transient state having difficulty in controlling the quantity of fuel with a high frequency. This results in a significant error in control of the air/fuel ratio and thereby in insufficient reduction of the emission from the internal combustion engine under such conditions.

SUMMARY OF THE INVENTION

The object of the present invention is thus to ensure sufficient reduction of emission from an internal combustion engine mounted on a hybrid vehicle and thereby realize a hybrid vehicle that does not adversely affect the environment.

At least part of the above object is realized by an apparatus for controlling a vehicle which has an internal combustion engine for combusting a fuel ingested from an intake manifold and a motor mounted thereon and controls operation of the internal combustion engine and the motor in order to drive wheels by means of at least either one of the internal combustion engine and the motor. The apparatus includes: stop condition detecting means for detecting that a condition to stop the operation of the internal combustion engine is fulfilled; determination means for determining whether the internal combustion engine being operated is in an unstable state, in which a quantity of the fuel adhering to a wall surface is varied unstably; and continuous driving means for forcing the internal combustion engine to continue its operation in case that the determination means determines that the internal combustion engine is in the unstable state, even when the stop condition detecting means detects that the condition to stop the operation of the internal combustion engine is fulfilled.

In the apparatus of the present invention, once the internal combustion engine starts its operation, the driving state of the internal combustion engine is continued until the amount of fuel adhering to the wall surface is stabilized. Namely the amount of fuel adhering to the wall surface is in a stable state when the operation of the internal combustion engine is stopped. This enables the amount of vaporized fuel to be readily estimated at the time of re-start of the internal combustion engine. This ensures accurate calculation for the adequate control of the air/fuel ratio, thereby reducing the emission from the internal combustion engine to a desired level and realizing the low-pollution hybrid vehicle.

In case that the continuous driving means forces the internal combustion engine to continue driving, the distribution of the output torque of the internal combustion engine and the selection of the optimal driving state of the internal combustion engine can be determined arbitrarily. By way of example, the output torque of the internal combustion engine may be used to charge a battery that is a power source of the motor or to run the vehicle. Otherwise the clutch may be released to realize a non-loading condition. Available driving states of the internal combustion engine include an idle driving state with least fuel consumption and a highest-efficient driving state having the highest efficiency of fuel consumption. It is further preferable that the distribution of the output torque and the selection of the optimal driving state are not fixed but varied according to the driving condition of the hybrid vehicle, the state of instrumentation loading, and the discharging state of the battery.

In accordance with one preferable application, the apparatus further includes mode selection means for appropriately determining a driving mode of the vehicle by selecting one among a motor mode for driving the vehicle only by a motor, an internal combustion engine mode for driving the vehicle only by the internal combustion engine, and a combination mode for driving the vehicle by both the motor and the internal combustion engine, based on a step-on amount of an accelerator pedal and a vehicle speed. The stop condition detecting means includes means for detecting that the condition to stop the operation of the internal combustion engine is fulfilled when the mode selection means switches the driving mode from a mode other than the motor mode to the motor mode.

In case that the amount of fuel adhering to the wall surface is not stable at the time of a switch from either the internal combustion engine mode or the combination mode to the motor mode, this structure enables the driving state of the internal combustion engine to be continued.

In accordance with one preferable application, the apparatus further includes mode selection means for appropriately determining a driving mode of the vehicle by selecting one among a motor mode for driving the vehicle only by a motor, an internal combustion engine mode for driving the vehicle only by the internal combustion engine, and a combination mode for driving the vehicle by both the motor and the internal combustion engine, based on a step-on amount of an accelerator pedal and a vehicle speed. The continues driving means includes motor mode prohibiting means for prohibiting a switch to the motor mode by the motor selection means, thereby forcing the internal combustion engine to continue driving.

In accordance with one preferable structure, the mode selection means includes map storage means for storing a map that defines areas of the motor mode, the internal combustion engine mode, and the combination mode based on the step-on amount of the accelerator pedal and the vehicle speed. The motor mode prohibiting means includes means for changing the map stored in the map storage means to a modified map having no area of the motor mode.

This structure readily prohibits a switch to the motor mode simply by changing the map.

In accordance with one preferable structure, the determination. means include means for determining whether or not the internal combustion engine is in the unsteady state, based on a warm-up condition of the internal combustion engine. In the warmed-up internal combustion engine, the amount of fuel adhering to the wall surface is relatively small, because of the sufficiently high temperatures on the wall surface of the air intake system and the combustion chamber. Distributions of the temperature are uniform and stable in the respective constituents of the internal combustion engine. This makes the estimation of the amount of vaporized fuel easier and increases the accuracy of the calculation for adequate control of the air/fuel ratio, thereby further reducing emission from the internal combustion engine and realizing effective environmental preservation.

In accordance with another preferable structure, the determination means may include means for determining whether or not the internal combustion engine is in the unsteady state, based on properties of the fuel. The properties of the fuel supplied to the internal combustion engine are not fixed or constant, but the amount of vaporized fuel differs even under the identical warm-up condition. Determination of the properties of the fuel further makes the estimation of the amount of vaporized fuel easier. The properties of the fuel may be determined by any known method, for example, based on a deviation of the air/fuel ratio under the stable driving condition of the internal combustion engine.

In accordance with still another preferable structure, the determination means may include means for determining whether or not the internal combustion engine is in the unsteady state, based on a quantity of deposit adhering to an air intake system of the internal combustion engine. The amount of fuel adhering to the wall surface increases with an increase in deposit on the air intake system. Correcting a time-based variation in amount of fuel adhering to the wall surface due to the deposit further makes the estimation of the amount of vaporized fuel easier.

The present invention is also directed to a method of controlling a vehicle which has an internal combustion engine for combusting a fuel ingested from an intake manifold and a motor mounted thereon and controls operation of the internal combustion engine and the motor in order to drive wheels by means of at least either one of the internal combustion engine and the motor. The method includes the steps of:

(a) detecting that a condition to stop the operation of the internal combustion engine is fulfilled;

(b) determining whether the internal combustion engine being operated is in an unstable state, in which a quantity of the fuel adhering to a wall surface is varied unstably; and (c) forcing the internal combustion engine to continue its operation in case that it is determined that the internal combustion engine is in the unstable state in the step (b), even when it is detected that the condition to stop the operation of the internal combustion engine is fulfilled in the step (a).

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
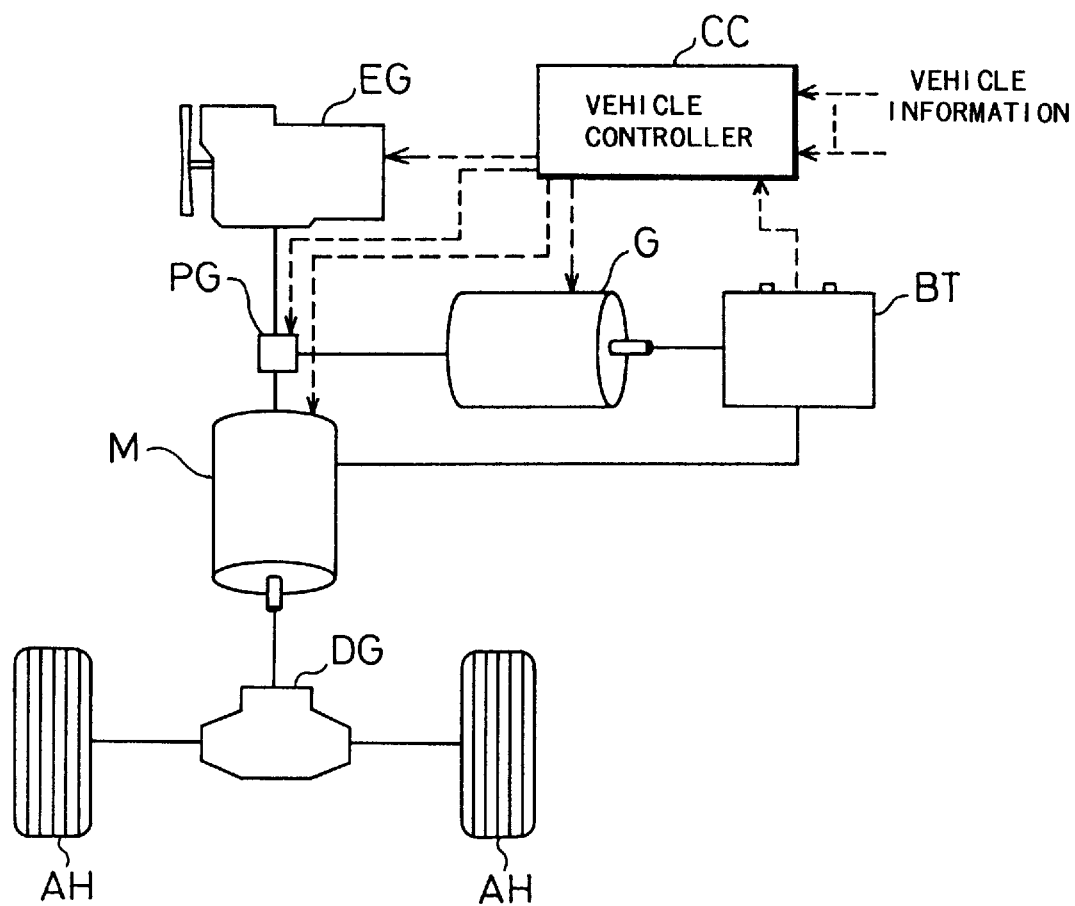
FIG. 1 schematically illustrates a hybrid vehicle with a vehicle control apparatus of a first embodiment according to the present invention mounted thereon.

Modes of carrying out the present invention are described below as preferred embodiments. FIG. 1 schematically illustrates a hybrid vehicle with a vehicle control apparatus of a first embodiment according to the present invention mounted thereon.

The hybrid vehicle has an internal combustion engine EG that is driven with a supply of fuel fed from a fuel tank (not shown) and has an output shaft connecting with a planetary gear unit PG. The planetary gear unit PG is further linked with a generator G and a motor M, so that the rotational motion of the output shaft of the internal combustion engine EG is distributed and transmitted to either one or both of the generator G and the motor M via the planetary gear unit PG. An output shaft of the motor M is connected to a differential gear DG, which is further linked with driving wheels AH of the vehicle.

Figure 2:
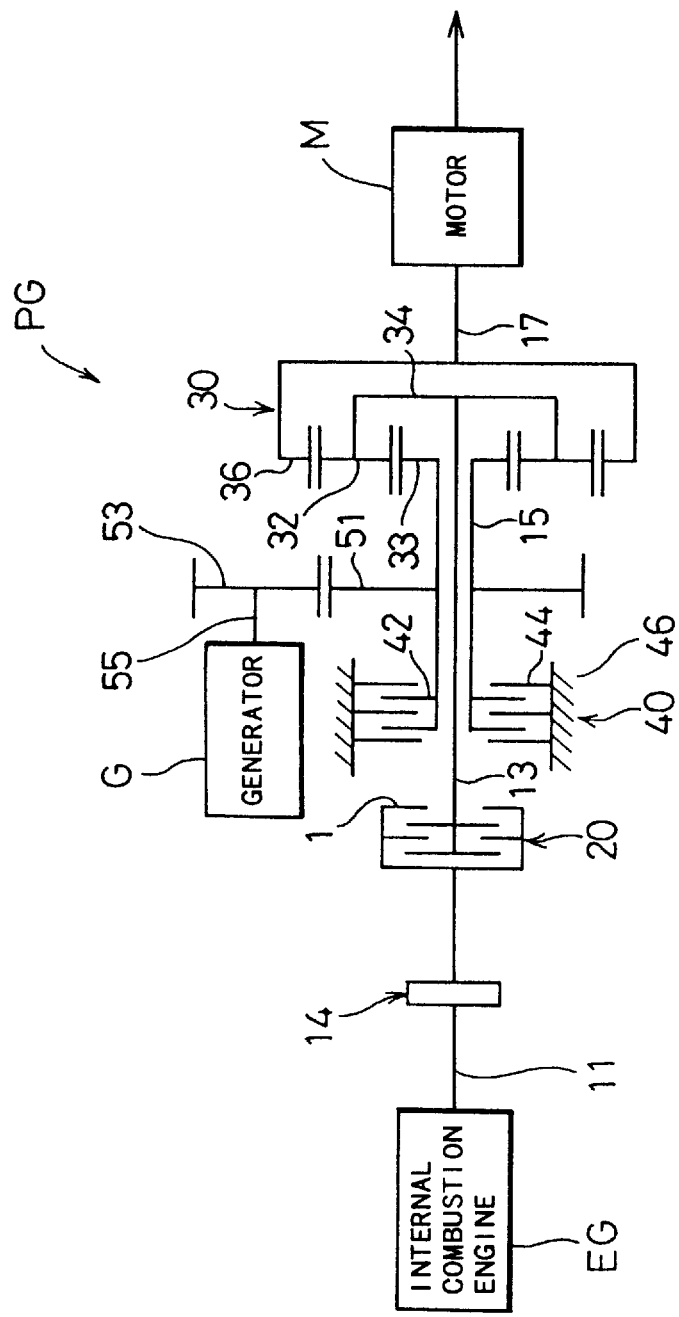
FIG. 2 schematically illustrates a planetary gear unit applied to the hybrid vehicle.

FIG. 2 shows a detailed structure of the planetary gear unit PG. Referring to FIG. 2, an output shaft 11 linked with a crankshaft of the internal combustion engine EG is further connected with an intermediate shaft 13 via a first clutch 20. The output shaft 11 is provided with a hydraulic pressure supply source 14, such as a gear pump. The hydraulic pressure supply source 14 consumes part of the power output from the internal combustion engine EG and generates a hydraulic oil pressure to function as a power source for connecting the first clutch 20. In accordance with an alternative structure, a hydraulic oil pressure may be generated not by the power of the internal combustion engine EG but with a small-sized separate motor. This alternative structure can operate the first clutch 20 while the internal combustion engine EG is at a stop.

The intermediate shaft 13 is integrally joined with a carrier 34 which supports a planetary gear 32 included in a planetary gear mechanism 30 to allow rotational motions of the planetary gear 32. A sun gear 33 engaging with the planetary gear 32 is attached integrally to a rear end of a hollow rotating shaft 15. A front end of the hollow rotating shaft 15 is connected to a rotatable frictional plate 42 of a second clutch 40 that constitutes a multi-plate-type gearshift brake. A stationary frictional plate 44 of the second clutch 40 is fixed to a casing 46. When a hydraulic oil pressure connects the second clutch 40, the hollow rotating shaft 15 becomes fixed to the casing 46. A gear 51 is further linked with the hollow rotating shaft 15 via splines. A rotating shaft 55 of a gear 53, engaging with the gear 51 works as a shaft of the generator G. A ring gear 36 of the planetary gear mechanism 30 is attached to an output shaft 17, which is further linked with the motor M.

The linkage of the motor M with the output shaft 17 is realized by, for example, connecting a rotor with the output shaft 17 while fixing a stator to a casing. This structure enables the rotational force generated by the motor M to be added to the rotational force of the output shaft 17.

The planetary gear unit PG having the above construction has already been proposed by the applicant of the present invention and is disclosed in JAPANESE PATENT LAYING-OPEN GAZETTE No. 50-30223. The planetary gear unit PG functions in the following manner, although the above-identified specification should be referred to for details.

In case that both the first clutch 20 and the second clutch 40 are released, the vehicle is in a first mode wherein the driving wheels AH are driven only with the motor M. In case that both the first clutch 20 and the second clutch 40 are connected, the vehicle is in a second mode wherein the driving force of the internal combustion engine EG is all transmitted to the side of the motor M and the driving wheels AH via the planetary gear mechanism 30. In case that the first clutch 20 is connected and the second clutch 40 is released, the vehicle is in a third mode wherein the driving force of the internal combustion engine EG is distributed by the planetary gear mechanism 30 and transmitted to the side of the generator G and the side of the motor M and the driving wheels AH.

The planetary gear unit PG can forcibly control the revolving speed of the internal combustion engine EG by varying the revolving speed of the output shaft of the generator G, whereas keeping the amount of air intake into the internal combustion engine EG at a constant level and thereby realizing a constant output of the internal combustion engine EG.

Referring back to FIG. 1, the electric power generated by the generator G, which is driven by means of the power of the internal combustion engine EG via the planetary gear unit PG, is used for charging a battery BT. The motor M is driven by means of the electric power supplied from the battery BT. The motor M is, for example, a d.c. brushless motor including a rotor with six pole-permanent magnets and a stator with three-phase windings. The generator G has a similar structure to that of the motor M. A variety of secondary cells, such as lead acid storage batteries, nickel-cadmium batteries, sodium-sulfur batteries, lithium secondary cells, hydrogen secondary cells, and redox cells, fuel cells, and capacitors with large capacity are applicable for a battery BT.

In the hybrid vehicle of the first embodiment, a selection control is carried out based on a two-dimensional map of vehicle speed V and accelerator position θ (mode selection table discussed later) prepared in advance. The selection control selects an appropriate mode among a motor mode wherein the vehicle is driven only by the motor M, an internal combustion engine mode wherein the vehicle is driven only by the internal combustion engine EG, and a combination mode wherein the vehicle is driven by both the motor M and the internal combustion engine EG. A vehicle controller CC mounted on the hybrid vehicle executes this selection control. In accordance with a concrete procedure, the vehicle controller CC receives a variety of information regarding a drive of the vehicle (hereinafter referred to as vehicle information), calculates a load required by the vehicle, and controls the respective constituents, that is, the internal combustion engine EG, the planetary gear unit PG, the generator G, and the motor M, based on the vehicle-required load, thus implementing the selection control.

Figure 3:
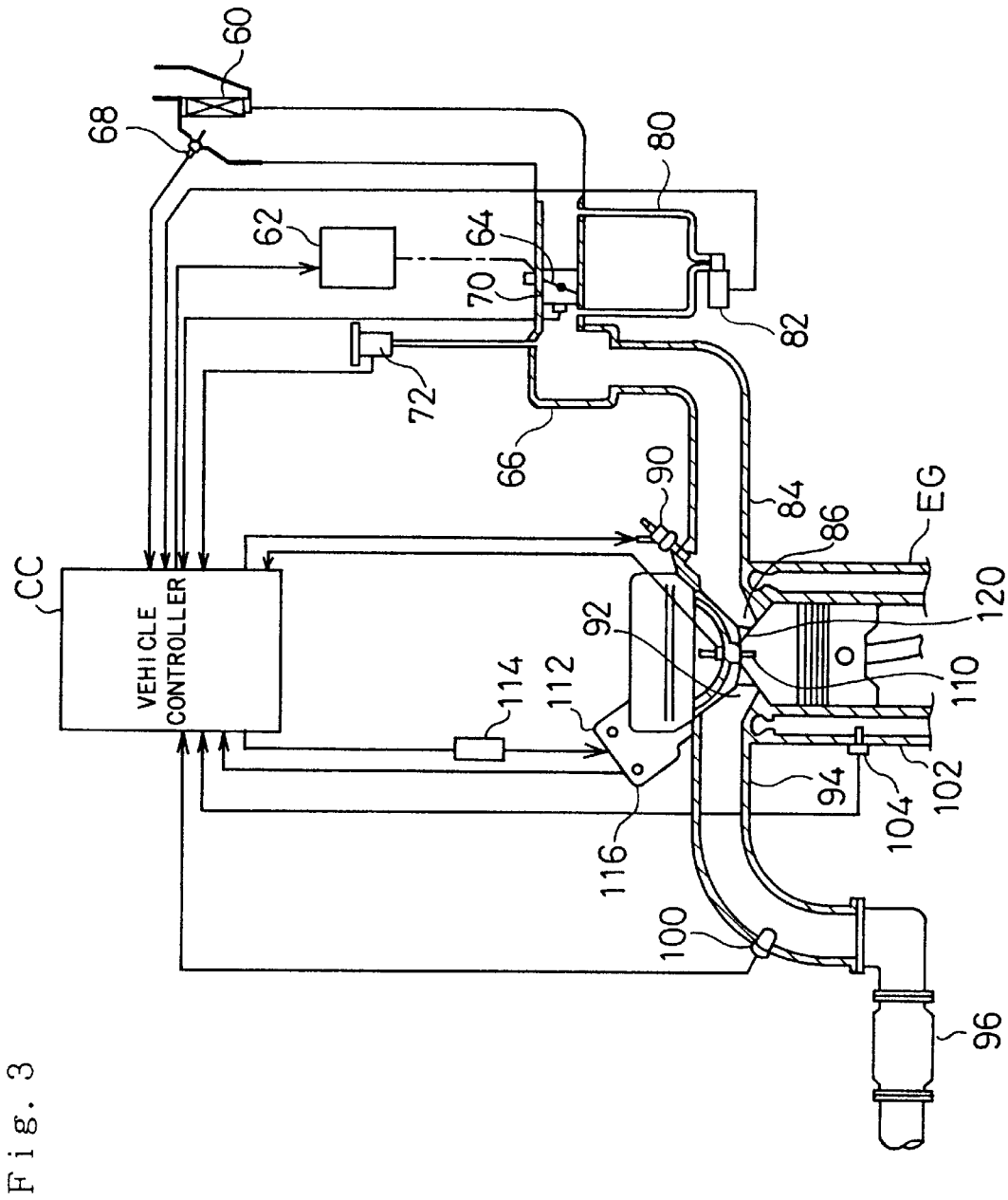
FIG. 3 shows structure of an internal combustion engine and peripheral elements mounted on the hybrid vehicle.

FIG. 3 shows structure of the internal combustion engine EG and its peripheral elements. Referring to FIG. 3, a throttle valve 64 driven to open and close by a throttle actuator 62 that is driven and controlled by the vehicle controller CC is disposed after an air cleaner 60 of the internal combustion engine EG. A surge tank 66 is further arranged downstream the throttle valve 64. An intake air temperature sensor 68 for measuring the temperature of the intake air is disposed in the vicinity of the air cleaner 60. An idle switch 70 which is mounted on the throttle valve 64 is in ON position under the full-close condition of the throttle. A diaphragm pressure sensor 72 is further attached to the surge tank 66.

A bypass passage 80 is formed to make a circuit round the throttle valve 64 and has an ISCV (idle speed control valve) 82, the position of which is regulated by a solenoid. The quantity of the air passing through the bypass passage 80 is adjusted by controlling the duty ratio of the solenoid current. This implements idle speed control that stabilizes the revolving speed at an idling time to a target value. The surge tank 66 connects to a combustion chamber of the internal combustion engine EG via an intake manifold 84 and an air intake port 86. A fuel injection valve 90 of each cylinder is arranged to be projected into the intake manifold 84.

The combustion chamber of the internal combustion engine EG is further connected to a catalytic converter 96 that is filled with a three-way catalyst, via an exhaust port 92 and an exhaust manifold 94. The exhaust manifold 94 is further provided with an oxygen sensor 100 for measuring the concentration of oxygen included in an exhaust gas and outputting signals which are inverted before and after a stoichiometric air/fuel ratio. A cooling water temperature sensor 104 passes through an engine block 102 and goes into a water jacket to detect a warm-up state of the internal combustion engine EG based on the temperature of cooling water of the internal combustion engine EG. An ignition plug 110 is attached to pierce a cylinder head of the internal combustion engine EG and is connected to the vehicle controller CC via a distributor 112 and an igniter 114. The distributor 112 includes a revolving speed sensor 116 that generates an output signal at every predetermined angle of shaft rotation, for example, at every 30 degree CA. The ignition plug 110 used in the first embodiment has a known inter-cylinder pressure sensor 120 attached to a washer thereof and is fixed to the internal combustion engine EG. The ignition plug 110 converts a variation in inter-cylinder pressure closely related to the combustion condition in the combustion chamber to a quantity of charge and outputs the resulting value, that is the converted quantity of charge, to the vehicle controller CC.

Figure 4:
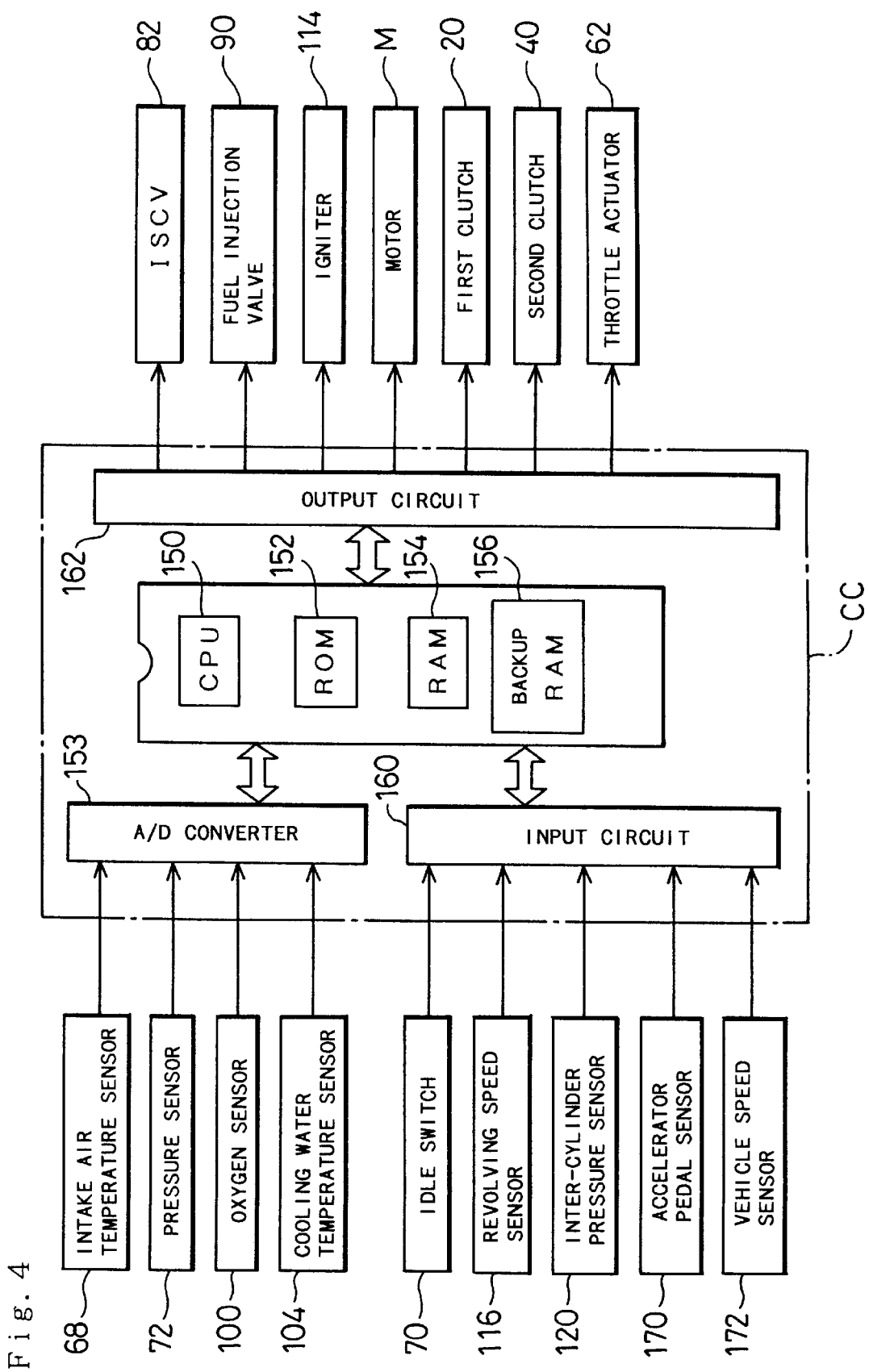
FIG. 4 is a block diagram showing a signal processing system including a vehicle controller.

FIG. 4 is a block diagram illustrating a control system of the hybrid vehicle including the vehicle controller CC. The vehicle controller CC is constructed as a logical operation circuit including a microcomputer as shown in FIG. 4. The vehicle controller CC includes a CPU 150 for executing a variety of operations according to preset control programs, a ROM 152, in which control programs and control data required for the various operations executed by the CPU 150 are stored in advance, a RAM 154, which a variety of data required for the various operations executed by the CPU 150 are temporarily written into and read from, a backup RAM 156 for maintaining data during power-off time, an A/D converter 158 and an input circuit 160 for receiving the vehicle information, and an output circuit 162 for driving the throttle actuator 62 and the ISCV 82 based on the results of operation by the CPU 150 to control the internal combustion engine EG to a desired driving state and outputting driving signals to the first clutch 20 and the second clutch 40 of the planetary gear unit PG and the motor M to select one out of the motor mode, the internal combustion engine mode, and the combination mode.

Other than the above sensors and switches arranged in the vicinity of the internal combustion engine EG, there are a variety of sensors and switches used for obtaining the vehicle information. These sensors and switches include an accelerator pedal sensor 170 for measuring a step-on amount of an accelerator pedal by a driver, a vehicle speed sensor 172 for measuring the speed of the vehicle, an ignition switch for controlling a start and a stop of the vehicle, and a battery remaining charge sensor for measuring a remaining charge of the battery BT. These sensors and switches are electrically connected to the A/D converter 158 and the input circuit 160 to send the vehicle information to the vehicle controller CC.

The vehicle controller CC thus constructed detects the driving condition of the vehicle, controls the internal combustion engine EG, the motor M, and the generator G based on the detected driving condition, and appropriately selects one among the motor mode, the internal combustion engine mode, and the combination mode to realize a hybrid drive.

Figure 5:
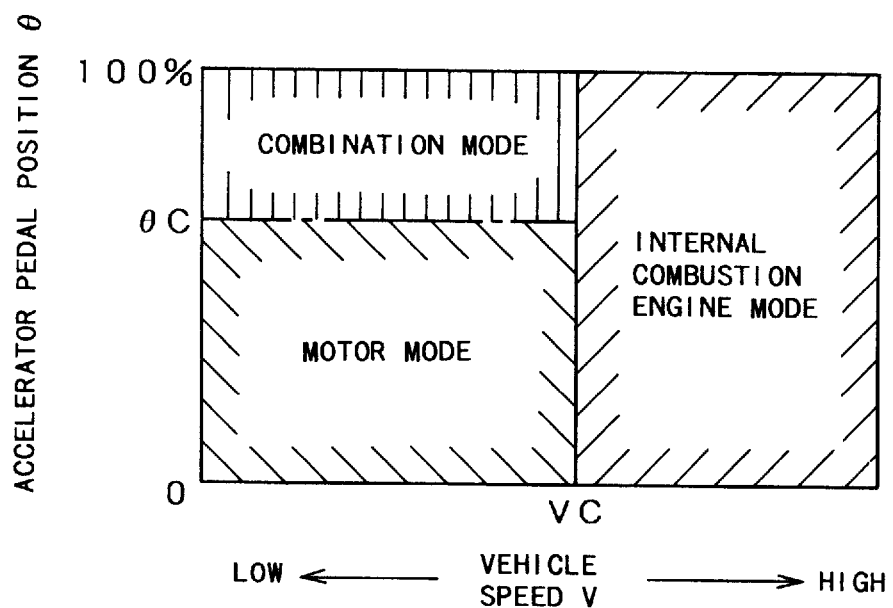
FIG. 5 shows contents of a mode selection table used by the vehicle controller.
Figure 6:
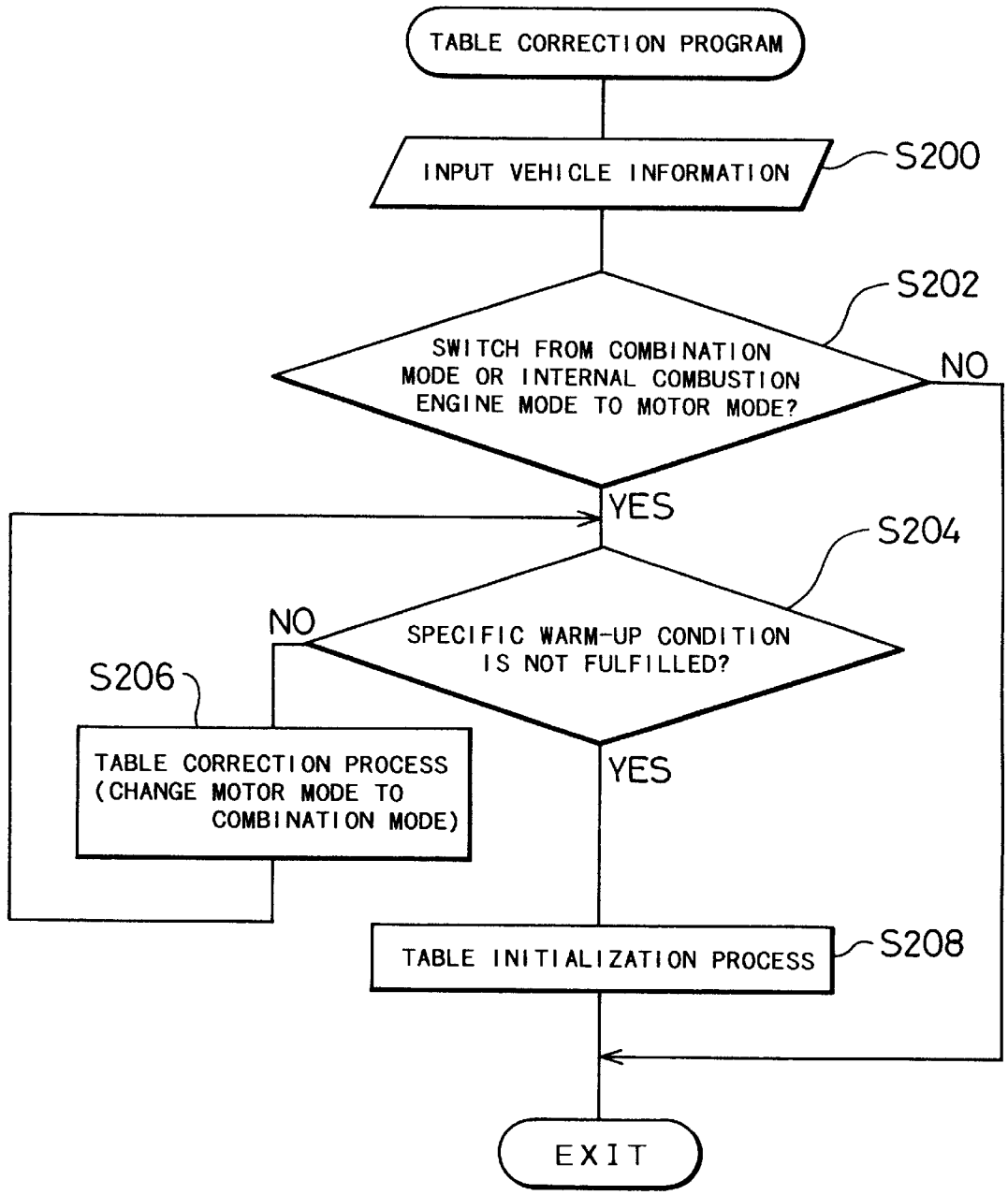
FIG. 6 is a flowchart showing a table correction routine executed by the vehicle controller.

The following describes a mode selection program carried out by the vehicle controller CC by referring to FIGS. 5 and 6. FIG. 5 shows a mode selection table used for determining a drive mode based on an accelerator pedal position θ and a vehicle speed V. In the drawing of FIG. 5, a reference vehicle speed VC and a reference accelerator pedal position θC on boundaries are determined in advance based on the output characteristics of the motor M and the internal combustion engine EG and the characteristics of a transmission (not shown). Although being shown as specific values in the drawing, both the reference vehicle speed VC and the reference accelerator pedal position θC have hysteresis areas of a fixed width, in order to prevent the mode from being switched frequently in the vicinity of the boundaries. In the mode selection table of the first embodiment, the motor mode for driving the vehicle only with the motor M is selected when both the accelerator pedal position θ and the vehicle speed V are smaller than the corresponding reference values θC and VC. In case that the accelerator pedal position θ becomes greater than the reference value θC and the vehicle speed V is not greater than the reference value VC, the motor mode is shifted to the combination mode for driving the vehicle with both the motor M and the internal combustion engine EG. When the vehicle speed V becomes greater than the reference value VC, the internal combustion engine mode is selected to drive the internal combustion engine EG alone irrespective of the accelerator pedal position θ.

The mode selection table is optimally designed by taking into account the drivability, the acceleration properties, and the fuel consumption ratio of the hybrid vehicle. When the mode selection table is used directly, the condition of shifting the state of the hybrid vehicle from the internal combustion engine mode or the combination mode, wherein the internal combustion engine EG is driven, back to the motor mode is determined only by the vehicle speed V and the accelerator pedal position θ at that time, and does not reflect the other driving conditions of the internal combustion engine EG. The vehicle controller CC of the first embodiment accordingly executes a table correction routine as shown in the flowchart of FIG. 6 to change the mode selection table according to the requirements.

The table correction routine is repeatedly carried out at least at predetermined timings after each start of operation of the internal combustion engine EG, for example, at every 30 degree CA. When the program enters the table correction routine, the control CPU 150 first receives the variety of vehicle information as stated above at step S200, and compares the accelerator pedal position θ and the vehicle speed V in the vehicle information with the mode selection table, in order to determine whether or not the state of the vehicle should be shifted from either the combination mode or the internal combustion engine mode to the motor mode, that is, whether or not the operation of the internal combustion engine EG is going to stop, at step S202. When no such a mode shift is required, the program immediately exits from this routine. When such a mode shift is required, on the contrary, the program proceeds to step S204 to determine whether or not a specific warm-up condition is satisfied.

Figure 7:
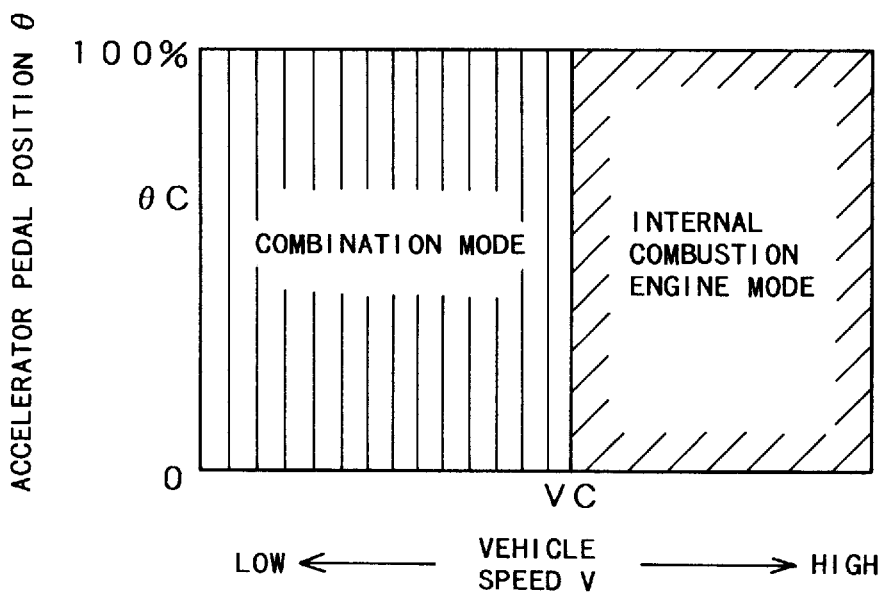
FIG. 7 shows the contents of the mode selection table modified by the table correction routine.

The specific warm-up condition is used as a criterion for determining whether or not a fuel-air intake system of the internal combustion engine EG shows a sufficient increase in temperature and reaches a stationary state, wherein the amount of fuel injected and supplied into the fuel-air intake system and adhering to the wall surface can be estimated readily. The specific warm-up condition is determined to be fulfilled or not, based on a value of measurement by the cooling water temperature sensor 104 or on the combination of this value with a value of measurement by the intake air temperature sensor 68. When it is determined that the warm-up condition is not satisfied at step S204, the program goes to step S206 to carry out a table correction process and change a driving range for selecting the motor mode (accelerator pedal position θ is not greater than the reference value θC or the vehicle speed V is not greater than the reference value VC) to another driving range for selecting the combination mode. This process changes the contents of the mode selection table to those shown in FIG. 7. The program then returns to step S204 and repeats the processing of step S204 and subsequent steps.

When it is determined that the warm-up condition is satisfied at step S204, on the other hand, the program proceeds to step S208 to carry out a table initialization process and return the contents of the mode selection table to the initial state shown in FIG. 5. After the processing of step S208, the program immediately exits from this routine.

The table correction routine prevents the hybrid vehicle of the embodiment from selecting the motor mode until the internal combustion engine EG reaches a stationary state wherein the specific warm-up condition is satisfied, once the internal combustion engine EG starts operation, and causes the hybrid vehicle to preferentially select either the combination mode or the internal combustion engine mode. When the internal combustion engine EG satisfies the specific warm-up condition, the table initialization process is carried out. This results in effecting a shift to the motor mode according to the mode selection table shown in FIG. 5 and stopping operation of the internal combustion engine EG.

In case that the internal combustion engine EG repeats a start and a stop of its operation in a transient driving state, the structure of the embodiment continues the operation of the internal combustion engine EG until the internal combustion engine EG fulfills the specific warm-up condition. Since the specific warm-up condition is satisfied at a stop of the internal combustion engine, a uniform distribution of temperature can be observed in the air intake system and the combustion chamber of the internal combustion engine EG. The amount of fuel adhering to the wall surface of the air intake system and the combustion chamber accordingly takes a stable and predictable constant value. This enables the quantity of vaporized fuel to be readily estimated at the time of a re-start of the internal combustion engine EG, thereby carrying out the control of the air/fuel ratio of the internal combustion engine EG with a high accuracy. This effectively reduces emission from the internal combustion engine EG. Whenever the internal combustion engine EG starts its operation, the internal combustion engine EG is controlled to a stationary state at which the warm-up is completed. This shortens a time period required for activating the three-way catalyst in the catalytic converter 96 at the time of a re-start of the internal combustion engine EG, thus further reducing the emission.

In the first embodiment, the table correction process (step S206) is carried out to change the motor mode to the combination mode, in order to continue the operation of the internal combustion engine EG. The same effects can be attained by an alternative structure, wherein the mode selection table is not changed and the vehicle is driven in the motor mode, while the driving condition of the internal combustion engine EG is maintained irrespective of the drive of the vehicle until a predetermined warm-up state is realized. A second embodiment according to the present invention adopts this alternative structure as described below.

A start control apparatus of the internal combustion engine EG, of the second embodiment has a hardware structure identical with that of the first embodiment, but carries out a different warm-up program by its vehicle controller CC. In the second embodiment, the vehicle controller CC executes a warm-up routine shown in the flowchart of FIG. 8, in place of the table correction routine of the first embodiment shown in the flowchart of FIG. 6.

Figure 8:
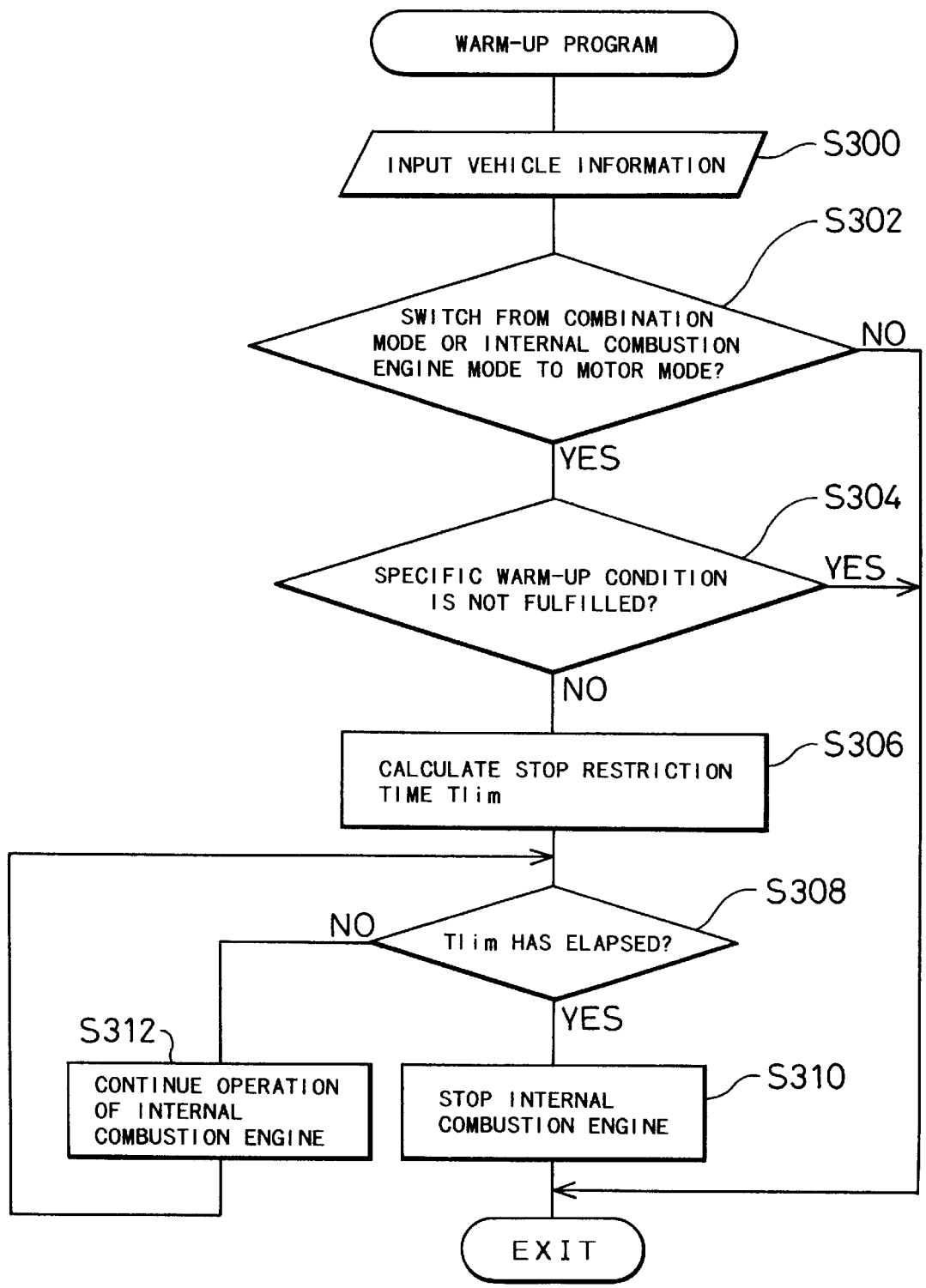
FIG. 8 is a flowchart showing a warm-up routine executed in a second embodiment according to the present invention.

When the program enters the warm-up routine of FIG. 8, the CPU 150 first carries out the processing of steps S300 through S304, which is identical with that of steps S200 through S204 of the first embodiment.

When the selected mode is to stop the internal combustion engine EG that has started its operation at step S302 and it is determined that the specific warm-up condition is not fulfilled at step S304 the program goes to a warm-up process of step S306 and subsequent steps. Otherwise, the program exits from this routine immediately. At step S306, the CPU 150 calculates a stop restriction time Tlim from the vehicle information input at step S300. The stop restriction time Tlim represents a time period for which the operation of the internal combustion engine EG should be continued in order to enable the internal combustion engine EG to satisfy the specific warm-up condition, that is, for which the operation of the internal combustion engine EG is not allowed to stop although the vehicle is driven only by the motor M.

The stop restriction time Tlim is calculated from any one of the various vehicle information given below or from the combination thereof.

(1) The values of measurement by the cooling water temperature sensor 104 are data substantially representing the warm-up condition of the internal combustion engine EG. In the same manner as the first embodiment, the stop restriction time Tlim may accordingly be calculated from the value of measurement by the cooling water temperature sensor 104 or from the combination of this value with the value of measurement by the intake air temperature sensor 68.

(2) The warm-up condition of the internal combustion engine EG is set by continuous operation of the internal combustion engine EG. A time period of continuous operation since a start of the internal combustion engine EG or a time period elapsing before a re-start accordingly represents the warm-up condition of the internal combustion engine EG. As is well known, the CPU 150 carries out the processing synchronously with clock signals output from a preset clock circuit, and thereby has an extremely accurate time-counting function. A timer for counting the time period of continuous operation or the time period elapsing before a re-start is set at a predetermined address in the backup RAM 156. The stop restriction time Tlim is then calculated from the time period of continuous operation or the time period elapsing before a re-start that is counted with the timer.

(3) The object of the calculation of the stop restriction time Tlim is to force the internal combustion engine EG to continue operation until the quantity of fuel adhering to the fuel supply system of the internal combustion engine EG is stabilized to a stationary state. The stop restriction time Tlim is thus significantly related to the distillation properties of the fuel used in the internal combustion engine EG. A variation in air intake measured by the pressure sensor 72 is compared with a variation in pressure in the combustion chamber measured by the inter-cylinder pressure sensor 120. A small phase difference between the two variations represents a fuel having light cuts, whereas a large phase difference represents a fuel having heavy cuts. The stop restriction time Tlim is accordingly calculated from this phase difference.

(4) Even when the fuel has identical properties, the quantity of fuel adhering to the fuel supply system of the internal combustion engine EG is varied by the condition of the wall surface of the fuel supply system. It is known that a long-term use causes a deposit on the intake manifold of the internal combustion engine EG and the quantity of fuel adhering to the wall surface increases with an increase in deposit. The quantity of deposit is calculated by taking into account the excess or deficient quantity of fuel supply according to the quantity of deposit, that is, a release or supplement of the fuel due to the deposit, at the time of a transient drive, for example, at the time of acceleration or reduction of the internal combustion engine EG. The measurement data given by the revolving speed sensor 116 and the data of throttle valve position are used to determine the condition of acceleration or reduction of the internal combustion engine EG. A deviation of the air/fuel ratio under the detected condition is read from the data of the oxygen sensor 100, and the quantity of deposit is then calculated from the deviation. The longer stop restriction time Tlim is set for the greater quantity of deposit.

(5) It is presumed that the greater quantity of fuel injected and supplied from the fuel injection valve 90 of the internal combustion engine EG immediately before a shift to the motor mode, that is, the greater accumulated amount of injection per unit time represents that the fuel supply system of the internal combustion engine EG is in an excess saturated condition. The excess saturated condition shows that a large quantity of fuel adheres to the wall surface. The accumulated amount of injection per unit time is calculated from a driving time of the fuel injection valve 90, and the stop restriction time Tlim is increased or decreased according to the results of calculation.

Referring back to the flowchart of FIG. 8, at step S308, the stop restriction time Tlim calculated at step S306 is compared with a time period of continuous operation of the internal combustion engine EG since a time point of shifting to the motor mode. Namely it is determined whether or not the stop restriction time Tlim has elapsed at step S308. When it is determined that the stop restriction time Tlim has already elapsed, the program proceeds to step S310 to stop operation of the internal combustion engine EG. When it is determined that the elapse of time is less than the stop restriction time Tlim, on the contrary, the program proceeds to step S312 to continue operation of the internal combustion engine EG and then returns to step S308. After the execution of step S310, the program exits from this routine.

The hybrid vehicle of the second embodiment having the above construction exerts the similar effects to those of the first embodiment. The second embodiment prohibits a stop of operation of the internal combustion engine EG for the stop restriction time Tlim, and does not require any complicated control procedure, such as a correction of the mode selection table. The internal combustion engine EG is forced to continue its operation, independently of a drive of the vehicle. This enables the driving state during the stop restriction time Tlim to be arbitrarily designed. When the driving state during the stop restriction time Tlim is set to be an idle driving state, for example, this can reduce the noise and decrease the amount of fuel consumption.

The present invention is not restricted to the above embodiments or applications, but there may be many modifications, changes, and alterations without departing from the scope or spirit of the main characteristics of the present invention.

It should be clearly understood that the above embodiments discussed above are only illustrative and not restrictive in any sense The scope and spirit of the present invention are limited only by the terms of the appended claims.

What is claimed is:

1. An apparatus for controlling a vehicle which has an internal combustion engine for combusting a fuel ingested from an intake manifold and a motor mounted thereon and controls operation of said internal combustion engine and said motor in order to drive wheels by means of at least either one of said internal combustion engine and said motor, said apparatus comprising:

stop condition detecting means for detecting that a condition to stop the operation of said internal combustion engine is fulfilled;

determination means for determining whether said internal combustion engine being operated is in an unstable state, in which a quantity of the fuel adhering to a wall surface is varied unstably; and continuous driving means for forcing said internal combustion, engine to continue its operation in case that said determination means determines that said internal combustion engine is in the unstable state, even when said stop condition detecting means detects that the condition to stop the operation of said internal combustion engine is fulfilled.

2. An apparatus in accordance with claim 1, said apparatus further comprising:

mode selection means for appropriately determining a driving mode of said vehicle by selecting one among a motor mode for driving said vehicle only by a motor, an internal combustion engine mode for driving said vehicle only by said internal combustion engine, and a combination mode for driving said vehicle by both said motor and said internal combustion engine, based on a step-on amount of an accelerator pedal and a vehicle speed, said stop condition detecting means comprising:

means for detecting that the condition to stop the operation of said internal combustion engine is fulfilled when said mode selection means switches the driving mode from a mode other than the motor mode to the motor mode.

3. An apparatus in accordance with claim 1, said apparatus further comprising:

mode selection means for appropriately determining a driving mode of said vehicle by selecting one among a motor mode for driving said vehicle only by a motor, an internal combustion engine mode for driving said vehicle only by said internal combustion engine, and a combination mode for driving said vehicle by both said motor and said internal combustion engine, based on a step-on amount of an accelerator pedal and a vehicle speed, said continues driving means comprising:

motor mode prohibiting means for prohibiting a switch to the motor mode by said motor selection means, thereby forcing said internal combustion engine to continue driving.

4. An apparatus in accordance with claim 3, wherein said mode selection means comprises:

map storage means for storing a map that defines areas of the motor mode, the internal combustion engine mode, and the combination mode based on the step-on amount of said accelerator pedal and the vehicle speed, said motor mode prohibiting means comprising:

means for changing the map stored in said map storage means to a modified map having no area of the motor mode.

5. An apparatus in accordance with claim 1, wherein said determination means comprises:

means for determining whether or not said internal combustion engine is in the unsteady state, based on a warm-up condition of said internal combustion engine.

6. An apparatus in accordance with claim 1, wherein said determination means comprises:

means for determining whether or not said internal combustion engine is in the unsteady state, based on properties of the fuel.

7. An apparatus in accordance with claim 1, wherein said determination means comprises:

means for determining whether or not said internal combustion engine is in the unsteady state, based on a quantity of deposit adhering to an air intake system of said internal combustion engine.

8. A method of controlling a vehicle which has an internal combustion engine for combusting a fuel ingested from an intake manifold and a motor mounted thereon and controls operation of said internal combustion engine and said motor in order to drive wheels by means of at least either one of said internal combustion engine and said motor, said method comprising the steps of:

(a) detecting that a condition to stop the operation of said internal combustion engine is fulfilled;

(b) determining whether said internal combustion engine being operated is in an unstable state, in which a quantity of the fuel adhering to a wall surface is varied unstably; and (c) forcing said internal combustion engine to continue its operation in case that it is determined that said internal combustion engine is in the unstable state in said step (b), even when it is detected that the condition to stop the operation of said internal combustion engine is fulfilled in said step (a).

9. A method in accordance with claim 8, said method further comprising the step of:

(d) appropriately determining a driving mode of said vehicle by selecting one among a motor mode for driving said vehicle only by a motor, an internal combustion engine mode for driving said vehicle only by said internal combustion engine, and a combination mode for driving said vehicle by both said motor and said internal combustion engine, based on a step-on amount of an accelerator pedal and a vehicle speed, said step (a) comprising the step of:

(a-1) detecting that the condition to stop the operation of said internal combustion engine is fulfilled when it is switched the driving mode from a mode other than the motor mode to the motor mode in said (d).

10. A method in accordance with claim 8, said method further comprising the step of:

(d) appropriately determining a driving mode of said vehicle by selecting one among a motor mode for driving said vehicle only by a motor, an internal combustion engine mode for driving said vehicle only by said internal combustion engine, and a combination mode for driving said vehicle by both said motor and said internal combustion engine, based on a step-on amount of an accelerator pedal and a vehicle speed, said step (c) comprises the step of:

(c-1) prohibiting a switch to the motor mode in said step (d), thereby forcing said internal combustion engine to continue driving.

11. A method in accordance with claim 10, wherein said step (d) comprises the step of:

(d-1) having access to a map that defines areas of the motor mode, the internal combustion engine mode, and the combination mode based on the step-on amount of said accelerator pedal and the vehicle speed, said step (c-1) comprising the step of:

changing said map used in said step (d-1) to a modified map having no area of the motor mode.

12. A method in accordance with claim 8, wherein said step (b) comprises the step of:

determining whether or not said internal combustion engine is in the unsteady state, based on a warm-up condition of said internal combustion engine.

13. A method in accordance with claim 8, wherein said step (b) comprises the step of:

determining whether or not said internal combustion engine is in the unsteady state, based on properties of the fuel.

14. A method in accordance with claim 8, wherein said step (b) comprises the step of:

determining whether or not said internal combustion engine is in the unsteady state, based on a quantity of deposit adhering to an air intake system of said internal combustion engine.

* * * * *